United States Patent
Zhang

(10) Patent No.: US 8,156,016 B2
(45) Date of Patent: Apr. 10, 2012

(54) METHOD AND SYSTEM FOR ACCOUNTING, ACCOUNTING CLIENT AND ACCOUNTING PROCESSING UNIT

(75) Inventor: Jin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 528 days.

(21) Appl. No.: 12/100,139

(22) Filed: Apr. 9, 2008

(65) Prior Publication Data

US 2008/0195511 A1     Aug. 14, 2008

Related U.S. Application Data

(63) Continuation of application No. PCT/CN2006/002904, filed on Oct. 30, 2006.

(30) Foreign Application Priority Data

Nov. 4, 2005   (CN) .......................... 2005 1 0115538

(51) Int. Cl.
G07B 17/00 (2006.01)
G07F 19/00 (2006.01)
H04M 15/00 (2006.01)

(52) U.S. Cl. ............................................ 705/30; 705/34
(58) Field of Classification Search ............... 705/30, 705/1
See application file for complete search history.

(56) References Cited

U.S. PATENT DOCUMENTS

| 6,049,784 A * | 4/2000 | Weatherly et al. ............... 705/38 |
| 6,854,014 B1 * | 2/2005 | Amin et al. ..................... 709/227 |
| 6,910,074 B1 * | 6/2005 | Amin et al. ..................... 709/227 |
| 7,430,530 B2 * | 9/2008 | Nilsson ............................ 705/30 |
| 2001/0029475 A1 * | 10/2001 | Boicourt et al. ................. 705/30 |
| 2002/0031094 A1 | 3/2002 | Yoshio |
| 2003/0033225 A1 * | 2/2003 | Meldahl .......................... 705/30 |
| 2003/0040988 A1 * | 2/2003 | Ha et al. .......................... 705/30 |
| 2003/0046194 A1 * | 3/2003 | McClendon et al. ........... 705/30 |
| 2003/0158798 A1 * | 8/2003 | Green ............................. 705/30 |

(Continued)

FOREIGN PATENT DOCUMENTS

CN         1344082 A      4/2002

(Continued)

OTHER PUBLICATIONS

Performance analysis of a denial of service by Tianwei Chen, Computer networks, vol. 49 Issue 3, Oct 19, 2005. pp. 449-464.*

(Continued)

*Primary Examiner* — Matthew Gart
*Assistant Examiner* — Harshad Parikh
(74) *Attorney, Agent, or Firm* — Leydig, Voit & Mayer, Ltd.

(57) ABSTRACT

A method and a system for accounting supporting Quality of Service (QoS) change during a session, and an AAA client and an accounting processing unit are disclosed. The method includes: detecting by an AAA client a QoS change notification of a session; obtaining by the AAA client the accounting information of the session; and sending the accounting information to an accounting processing unit of a AAA server; implementing by the accounting processing unit an accounting operation for the user of the session according to the accounting information. The system includes the AAA client and the accounting processing unit of the AAA server. By the embodiment of this invention, the accounting for a radio access network user may be more accurate and reasonable.

3 Claims, 3 Drawing Sheets

U.S. PATENT DOCUMENTS

| | | | |
|---|---|---|---|
| 2004/0193513 A1* | 9/2004 | Pruss et al. .................. 705/30 |
| 2005/0080692 A1* | 4/2005 | Padam et al. ................. 705/30 |
| 2006/0047822 A1* | 3/2006 | Willis ........................ 709/228 |
| 2006/0167771 A1* | 7/2006 | Meldahl ...................... 705/30 |
| 2007/0088636 A1* | 4/2007 | Nault ......................... 705/30 |
| 2008/0195511 A1 | 8/2008 | Zhang |
| 2008/0270274 A1* | 10/2008 | Mo et al. ..................... 705/34 |
| 2009/0119193 A1* | 5/2009 | Selleck ....................... 705/31 |
| 2009/0122756 A1* | 5/2009 | Gu et al. ..................... 370/329 |
| 2009/0150271 A1* | 6/2009 | Bishop et al. ................. 705/30 |

FOREIGN PATENT DOCUMENTS

| | | | |
|---|---|---|---|
| CN | 1362842 A | 8/2002 |
| CN | 1452333 A | 10/2003 |
| CN | 1585519 A | 2/2005 |
| CN | 1848741 A | 10/2006 |
| CN | 100370732 C | 2/2008 |
| JP | 10-051445 A | 2/1998 |
| JP | 2002-158656 A | 5/2002 |
| JP | 2003-500938 A | 1/2003 |
| JP | 2004-185622 A | 7/2004 |
| KR | 20010057374 A | 7/2001 |
| KR | 20040072859 A | 8/2004 |
| KR | 20030043915 A | 1/2005 |
| KR | 20050093055 A | 9/2005 |
| KR | 20070037897 A | 4/2007 |
| WO | WO 03/051028 A1 | 6/2003 |
| WO | WO 2004/079542 A2 | 9/2004 |
| WO | 2005/099184 A1 | 10/2005 |

OTHER PUBLICATIONS

PCT Written Opinion of the International Searching Authority (Dec. 12, 2006—completion of opinion date, mailing date not posted).

State Intellectual Property Office of the People's Republic of China, Examination Report in Chinese Patent Application No. 200510115538.8 (Jul. 6, 2007).

State Intellectual Property Office of the People's Republic of China, Examination Report in Chinese Patent Application No. 200680011636.X (Mar. 13, 2009).

State Intellectual Property Office of the People's Republic of China, Examination Report in Chinese Patent Application No. 200680011636.X (Dec. 2009).

International Search Report in corresponding PCT Application No. PCT/CN2006/002904 (Jan. 18, 2007).

Rejection Decision in corresponding Chinese Application No. 200680011636.X (Aug. 30, 2010).

Notice of Re-Examination in corresponding Chinese Application No. 200680011636.X (Jun. 22, 2011).

1$^{st}$ Office Action in corresponding European Application No. 06805108.5 (Apr. 27, 2011).

Office Action in corresponding Japanese Application No. 2008-535873 (Oct. 14, 2010).

Rejection Decision in corresponding Japanese Application No. 2008-535873 (Feb. 7, 2011).

Notice of Preliminary Rejection in corresponding Korean Application No. 10-2008-7011538 (Feb. 1, 2010).

"WiMAX End-to-End Network Systems Architecture (Stage 2: Architecture Tenets, Reference Model and Reference Points)," Sep. 15, 2005, Draft, WiMAX Forum, Beaverton, OR.

* cited by examiner

METHOD AND SYSTEM FOR ACCOUNTING, ACCOUNTING CLIENT AND ACCOUNTING PROCESSING UNIT

CROSS-REFERENCE TO RELATED APPLICATIONS

This application is a continuation of International Patent Application No. PCT/CN2006/002904, filed Oct. 30, 2006, which claims priority to Chinese Patent Application No. 200510115538.8, filed Nov. 4, 2005, both of which are hereby incorporated by reference in their entirety.

FIELD OF THE INVENTION

The disclosure relates to radio access networks, and more particularly to a method and system for accounting, accounting client and accounting processing unit in a radio access network.

BACKGROUND OF THE INVENTION

With the vigorous development of Internet service and the extensive application of radio network, radio systems such as General Packet Radio Service (GPRS), $3^{rd}$ Generation (3G), Worldwide Interoperability Microwave Access (WiMAX) and Beyond 3G (B3G) are applied and concerned widely. New requirements for radio access network system to support various services with large-capacity, large data throughout and different Quality of Service (QoS) are arising with the increase of the quantity and requirements of the users.

A radio access network mainly provides forwarding function or routing function for packet service between a service providing network and a mobile user. A main technology of radio access network system is to provide a user with a QoS-based steady data transmission service. The statistic of accounting information (i.e. data amount and service time) which is provided to a user according to the location area, is very important in the communication system. A WiMAX accounting network system as shown in FIG. 1 is an example for the description as follows. Internal devices not related to accounting in the WiMAX access network are not shown in the system.

In the WiMAX access network, an Access Service Network (ASN) provides a WiMAX terminal with radio access services. The ASN comprises a Base Station (BS) and an Access Service Network Gateway (ASN-GW), wherein, the functions of the BS include: (1) radio access function for Mobile Subscriber Station (MSS); (2) radio resource management; (3) measurement and power control; and (4) compression and encryption of air interface data. The functions of ASN-GW include providing the functions for MSS Authentication, Authorization and Accounting. The accounting function entity corresponding to the MSS is identified in FIG. 1. The logic unit of the accounting function entity is located in a certain ASN-GW and other MSS may be located in other ASN-GW. The functions of ASN-GW further include (1) supporting the network discovery and selection of NSP; (2) allocating an IP address to the MSS dynamically; and (3) radio resource management. The ASN-GW may further provide functions as follows: (1) handovering between BSs of the ASN; (2) MSS paging and location management; (3) tunnel management between the ASN and a Connectivity Service Network (CSN), which is equivalent to a Foreign Agent (FA) of mobile IP technology; (4) Authentication Proxy between the ASN and the CSN; and (5) visitor location registration.

In a WiMAX, the CSN provides a WiMAX terminal with IP connection services. The functions of CSN mainly include: (1) IP address allocation of MSS; (2) Internet accessing; (3) function as an Authentication, Authorization, Accounting proxy (AAA proxy) or an AAA server; (4) user-based Authentication control; (5) tunnel from the ASN to the CSN, which is equivalent to a Home Agent (HA) of mobile IP technology; (6) accounting for a WiMAX user and settlement between service providers (the AAA server or AAA proxy as shown in FIG. 1 mainly provides this function); (7) tunnel between CSNs in the roaming case; (8) handovering between ASNs; and (9) various WiMAX services (e.g., location-based services, multimedia multicast services, broadcast services and IP multimedia subsystem services).

The MSS is a mobile user device by which a user accesses a WiMAX network.

In the related art, the MSS accesses a BS through an R1 interface. The AAA client of the BS initiates an authentication procedure to the AAA server via the AAA proxy of the ASN-GW. The AAA server authenticates and authorizes the MSS. The MSS can initiate a QoS-based session for data transmission. The data of the MSS is eventually transmitted to the Internet by an HA through the R1 interface between the MSS and the BS, an R6 interface between the BS and the ASN-GW and an R3 interface between the ASN-GW and the HA in turn. At the beginning of the session, the AAA client notifies an accounting processing unit of the AAA server the information of starting the session, and begins to account. When the MSS or the network side initiates a termination of the session, the AAA client notifies the accounting processing unit the information of ending the session, and reports the accounting information of the MSS. The accounting information mainly includes duration of the session, data volume, authentication and authorization information of the session, and the QoS during the session establishment period.

In the related art, the AAA client reports the information of starting the session when the MSS establishes the session; the accounting information including the QoS of the session is reported. If the QoS of the session is changed during the session, the AAA client does not report the changed information of the QoS, neither report the session duration and data volume of the session with new QoS nor report the session duration and data volume of the session with old QoS to the AAA server respectively. The AAA server only accounts according to an accounting strategy corresponding to old QoS on the session establishment.

The MSS requires to change the QoS during the session under the WiMAX protocol. However, in the related art, the accounting can only be performed according to the accounting strategy corresponding to the QoS on the session establishment. If the MSS adopts a QoS with a high tariff on the session establishment and changes to adopt a QoS with a low tariff during the session, but the AAA server accounts for the session according to the QoS with high tariff; this accounting method is unfair to the users. If the MSS adopts a QoS with low tariff on the session establishment and changes to adopt a QoS with high tariff during the session, but the AAA server accounts for the session according to the QoS with low tariff; this accounting method is unfair to the service providers.

SUMMARY OF THE INVENTION

For the problem of the related art mentioned above, the disclosure provides a method and system for accounting supporting the QoS change during a session and an accounting client and accounting processing unit.

The embodiments of the present invention provide a method for accounting supporting QoS change during a session. The method may be applied in radio access system, and includes the following steps: detecting, by an AAA client, a notification of QoS change of a session; obtaining, by the AAA client, accounting information of the session and sending the accounting information of the session to an accounting processing unit of a AAA server; and implementing, by the accounting processing unit, an accounting operation for a user of the session according to the accounting information.

The embodiments of the present invention provide a system for accounting supporting the QoS change during a session including an AAA client and an accounting processing unit of an AAA server. The AAA client includes: a QoS change detection unit and an accounting information unit: the QoS change detection unit is adapted to detect a message received by the AAA client during a session and send an initiation instruction to the accounting information unit as detecting a QoS change notification; the accounting information unit is adapted to obtain and save accounting information as receiving the initiation instruction; and the accounting processing unit is adapted to receive the accounting information sent by the accounting client and implementing the an accounting operation for the session.

The embodiments of the present invention provide an AAA client applicable to a radio access system. The AAA client includes a QoS change detection unit and an accounting information unit; the QoS change detection unit is adapted to detect a message received by the accounting client during a session and send an initiation instruction to the accounting information unit as detecting a QoS change notification; and the accounting information unit is adapted to obtain and save the accounting information as receiving the initiation instruction.

The embodiments of the present invention provide an accounting processing unit applicable to a radio access system. The accounting processing unit includes: a prepaid service accounting processing unit, adapted to settle a cost according to accounting information, derive a tariff from new QoS, calculate a new quota according to the tariff and send the new quota to a AAA client; and/or, a postpaid service accounting processing unit, adapted to save accounting information and return a response message to the AAA client.

The disclosure provides advantages and notable progresses as follows. The accounting information is reported after the QoS of a session is changed. It makes the accounting of a user fairer by using an accounting strategy corresponding to the practical QoS used by the user. Therefore, the accounting for the user in the radio access network is more accurate and reasonable. In addition, the accounting strategy of the disclosure is facile to be added in the existing accounting system, which is simple and easy to perform in practical applications.

DETAILED DESCRIPTION OF THE INVENTION

Figure 1:
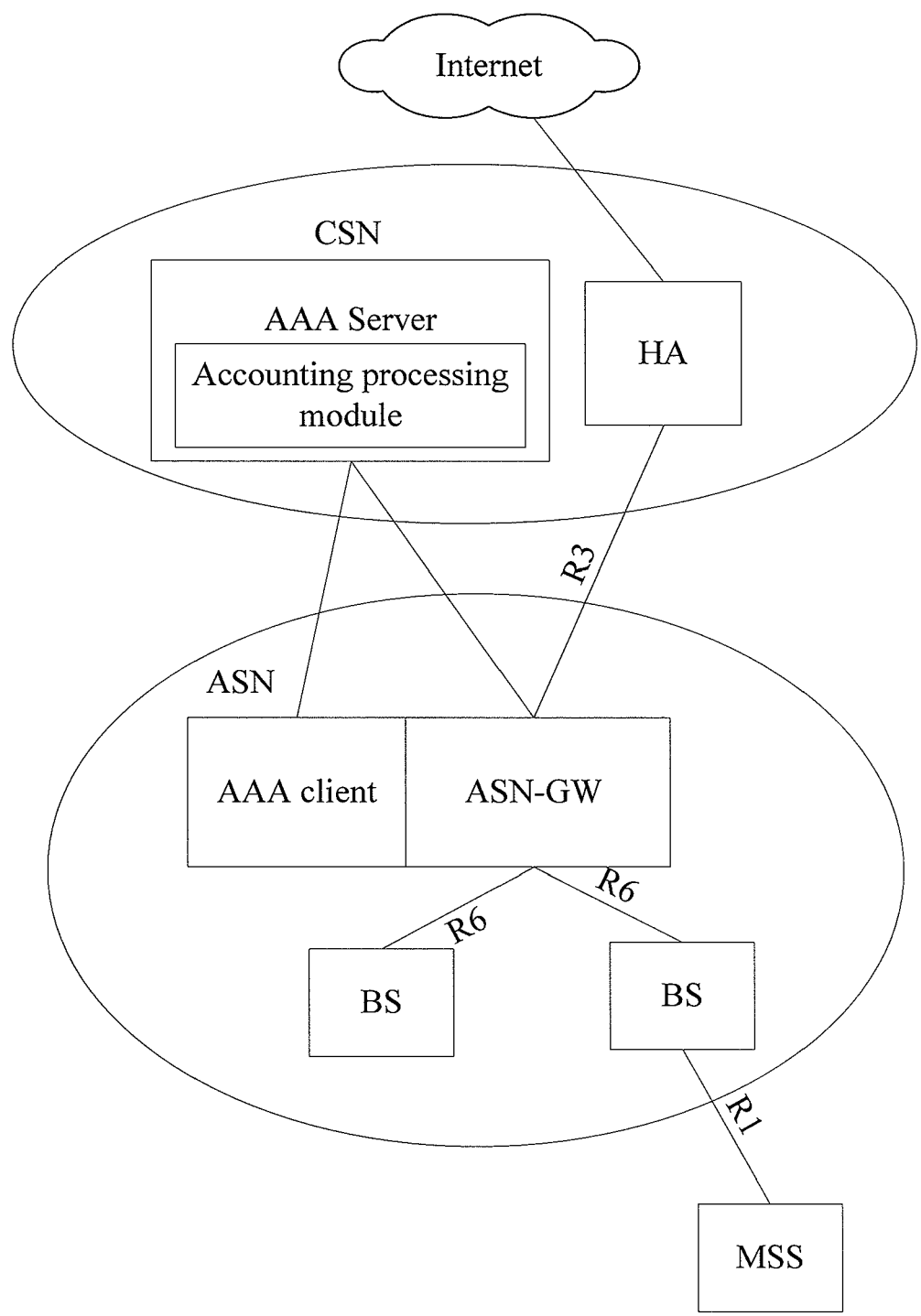
FIG. 1 illustrates a schematic diagram of a WiMAX accounting network.

For the purpose of clearly describing the technical solution of the present invention, the technical solution of the embodiments in the present invention is described as follows with a WiMAX system as an example, but the technical solution of the embodiments of the present invention is not limited to be applied in a WiMAX system such as illustrated in FIG. 1.

An embodiment of the present invention is described as follows in accordance with FIG. 2.

In this embodiment, an MSS has initiated a session with QoS; and one party of the MSS, a BS or an ASN-GW participating in the session requests to change the QoS of the session, the process is as follows.

In process 201, the MSS, the BS or the ASN-GW initiates a procedure for requesting to change the QoS of the session.

In this embodiment, the MSS, the BS or the ASN-GW may sends a QoS change request message to another network element necessary for negotiating the QoS. The network element for negotiating the QoS may be another MSS, BS or ASN-GW. The QoS change request message includes the QoS requested; the network element for negotiating the QoS receives the QoS change request message, and returns a QoS change response message according to the QoS change request message. The QoS change response message includes information of permitting or rejecting the QoS change request.

In process 202, when all parties participating in the session permit to change the QoS after negotiation, the QoS of the session is changed, and a QoS change complete response is sent as the QoS is changed successfully.

In process 203, as receiving the QoS change complete response, the BS or ASN-GW notifies the AAA client that the QoS is changed from old QoS to new QoS. As detecting a QoS change notification, the AAA client acquires accounting information of the session, such as the session duration and data volume of the session with the old QoS. The accounting information may be the session duration, or the data volume, or both the session duration and the data volume.

In process 204, the AAA client sends a report of the change information of the QoS of the session to the accounting processing unit of a prepaid server (because in this embodiment a prepaid accounting solution is adopted, the AAA server may be a PrePaid Server (PPS)); the report contains the accounting information of the session. The accounting information of the session includes the old QoS, the accounting information of the session with the old QoS, and the new QoS, and may include other accounting-related information.

In process 205, the PPS settles the cost according to the old QoS; the PPS derives a new tariff from the new QoS, and calculates a new quota according to the new tariff; and the PPS sends a response message including the new quota to the AAA client. The new quota includes the available session duration, the data volume, or both the available session duration and the data volume. The content of the new quota in the response message may be altered according to different practical applications.

In this embodiment, the old quota is the quota before the QoS is changed, and the new quota is the quota after the QoS is changed. As it is a prepaid service, so when the QoS is changed, the prepaid server settles the cost of the service before the QoS is changed according to the accounting information of the session with the old QoS information, and settles the cost of the service after the QoS is changed according to the accounting information of the session with the new QoS.

In this embodiment, if the QoS (i.e. the bandwidth, the delay, the jitter and the priority of the data transmission) rises or descends, cost per unit of time or cost per unit of traffic will increase or decrease respectively. Therefore, as the QoS is changed, the tariff is associated with the QoS.

An embodiment of the present invention is described as follows in accordance with FIG. 3.

In process 301, the MSS, the BS or the ASN-GW initiates a procedure for requesting to change the QoS of a session.

In process 302, when all parties participating in the session permit to change the QoS after negotiation, the QoS of session is changed, and a QoS change complete response is sent as the QoS is changed successfully.

In process 303, as receiving the QoS change complete response, the BS or the ASN-GW notifies the AAA client that the QoS is changed from old QoS to new QoS. As detecting a QoS change notification, the AAA client acquires the current accounting information of the session. The accounting information may be the session duration or the data volume of the session with the old QoS. The current accounting information of the session is the accounting information of the session with the old QoS.

In process 304, the AAA client sends a report of the change information of the QoS of the session to the accounting processing unit of an AAA server; the report contains the old QoS and the accounting information of the session with the old QoS received in process 303, and may also contain other accounting-related information.

In process 305, the AAA server saves the old QoS and the accounting information of the session with the old QoS, and returns a response message to the AAA client.

Figure 2:
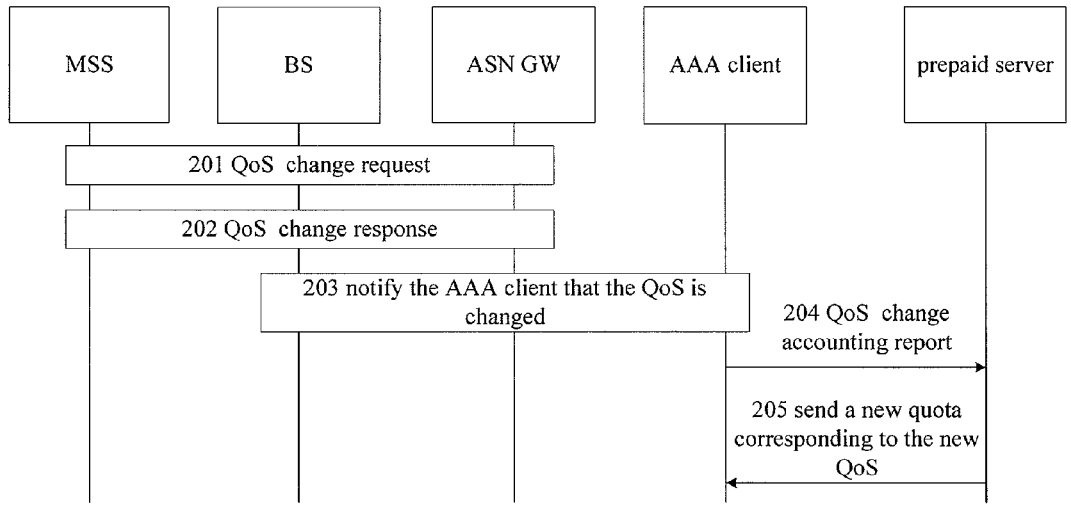
FIG. 2 illustrates a flowchart of accounting report when the QoS is changed in a prepaid manner in accordance with an embodiment of the present invention.

In the embodiment of FIG. 2, the method for accounting supporting the QoS change during a session is applicable for a prepaid accounting solution; when the QoS is changed, the prepaid server settles the cost of the service with the old QoS according to the accounting information of the session with the old QoS, and settles the cost of the service with the new QoS according to the accounting information of the session with the new QoS.

Figure 3:
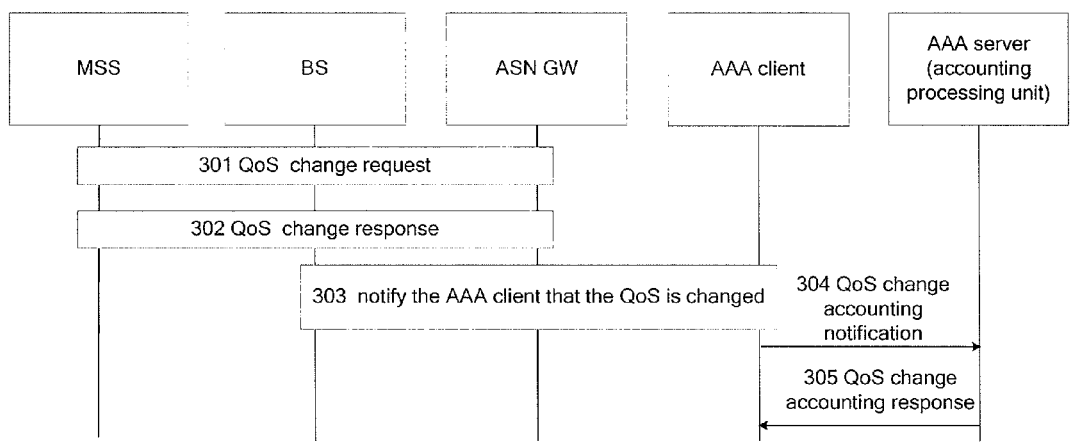
FIG. 3 illustrates a flowchart of accounting report when the QoS is changed in a postpaid manner in accordance with an embodiment of the present invention.

In the embodiment of FIG. 3, the method for accounting supporting the QoS change during a session is applicable for a postpaid accounting solution; when the QoS is changed, the QoS change-information and the accounting information of the session with the new QoS; after the service is completed, the system calculates the cost uniformly.

Figure 4:
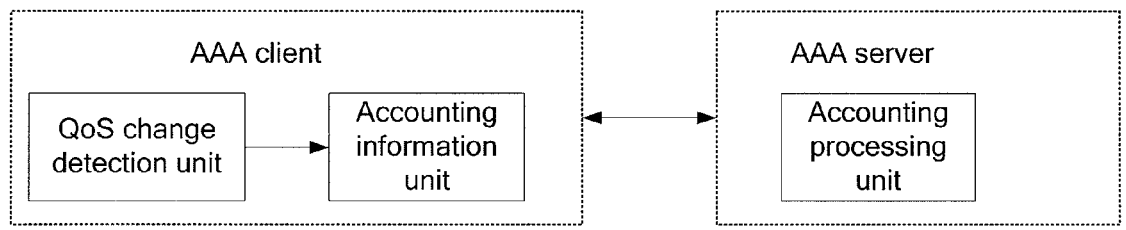
FIG. 4 illustrates the structure of an accounting system supporting the QoS change during a session in accordance with an embodiment of the present invention.

A accounting system for supporting the change of QoS during a session is described in accordance with FIG. 4. The system includes an AAA client and an accounting processing unit in an AAA server.

The AAA client includes a QoS change detection unit, an accounting information unit, and an accounting processing unit.

The QoS change detection unit is adapted to detect a message received by the AAA client during a session and send an initiation instruction to the accounting information unit as detecting a QoS change notification.

The accounting information unit is adapted to obtain and save the accounting information as receiving the initiation instruction.

The accounting processing unit is adapted to receive the accounting information sent by the AAA client and implement the corresponding accounting operation for the session.

Figure 5:
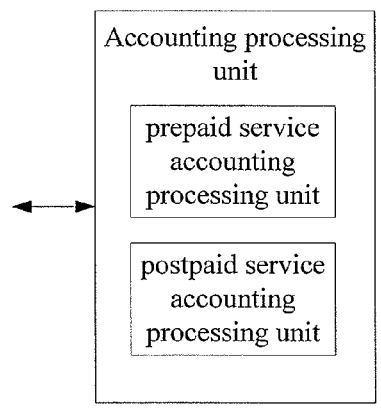
FIG. 5 illustrates the structure of an accounting processing unit in accordance with an embodiment of the present invention.

As shown in FIG. 5, the accounting processing unit may further includes a prepaid service accounting processing unit, or a postpaid service accounting processing unit, or both the prepaid service accounting processing unit and the postpaid service accounting processing unit.

The prepaid service accounting processing unit is adapted to settle a cost according to the accounting information, derive a new tariff of a session from new QoS, calculate a new quota according to the new tariff and send a response message including the new quota to the AAA client.

The postpaid service accounting processing unit is adapted to save the accounting information and return a response message to the AAAA client.

It should be noted that, in applications, the AAA client may be located in an ASN gateway or a BS, or be an individual network element. The session according to the embodiments of the present invention may be a data channel or a traffic flow.

The above is the description of the detailed embodiments of the present invention. The method, the system and the device of the present invention can be modified appropriately during a specific implementation, to meet the specific requirements of the specific cases. It is thereby understood that the detailed embodiments according to the present invention are just demonstrative of, but not limitative to the protection scope of the present invention.

What is claimed is:

1. A system for accounting, comprising an AAA client and an accounting processing unit; wherein
   the AAA client comprises a QoS change detection unit and an accounting information unit; wherein,
   the QoS change detection unit is adapted to detect a message received by the AAA client during a session and send an initiation instruction to the accounting information unit as detecting a QoS change notification; and,
   the accounting information unit is adapted to obtain and save the accounting information as receiving the initiation instruction; wherein,
   the accounting processing unit is adapted to receive the accounting information sent by the AAA client and implement an accounting operation for the session;
   wherein the accounting processing unit comprises:
   a prepaid service accounting processing unit, adapted to settle a cost according to an old QoS comprised in the accounting information, derive a tariff from a new QoS comprised in the accounting information, calculate a new quota according to the new tariff and send the new quota to the AAA client,
   wherein the AAA client is located in a mobile station.

2. A system for accounting, comprising an AAA client and an accounting processing unit; wherein
   the AAA client comprises a QoS change detection unit and an accounting information unit; wherein,
   the QoS change detection unit is adapted to detect a message received by the AAA client during a session and send an initiation instruction to the accounting information unit as detecting a QoS change notification; and,
   the accounting information unit is adapted to obtain and save the accounting information as receiving the initiation instruction; wherein, the accounting processing unit is adapted to receive the accounting information sent by the AAA client and implement an accounting operation for the session;

wherein the accounting processing unit comprises:

a prepaid service accounting processing unit, adapted to settle a cost according to an old QoS comprised in the accounting information, derive a tariff from a new QoS comprised in the accounting information, calculate a new quota according to the new tariff and send the new quota to the AAA client, wherein the AAA client is located in a base station.

3. A system for accounting, comprising an AAA client and an accounting processing unit; wherein the AAA client comprises a QoS change detection unit and an accounting information unit; wherein, the QoS change detection unit is adapted to detect a message received by the AAA client during a session and send an initiation instruction to the accounting information unit as detecting a QoS change notification; and, the accounting information unit is adapted to obtain and save the accounting information as receiving the initiation instruction; wherein, the accounting processing unit is adapted to receive the accounting information sent by the AAA client and implement an accounting operation for the session;

wherein the accounting processing unit comprises:

a prepaid service accounting processing unit, adapted to settle a cost according to an old QoS comprised in the accounting information, derive a tariff from a new QoS comprised in the accounting information, calculate a new quota according to the new tariff and send the new quota to the AAA client, wherein the AAA client is an individual network element.

* * * * *